US009718562B1

United States Patent
Fisher et al.

(10) Patent No.: US 9,718,562 B1
(45) Date of Patent: Aug. 1, 2017

(54) SYSTEM AND METHOD OF EVALUATING THE EFFECT OF DUST ON AIRCRAFT ENGINES

(71) Applicant: General Electric Company, Schenectady, NY (US)

(72) Inventors: Michael Howard Fisher, Cincinnati, OH (US); Andrew Scott Kessie, Springboro, OH (US); Mazen Hammoud, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/009,894

(22) Filed: Jan. 29, 2016

(51) Int. Cl.
*B64F 5/00* (2006.01)
*G08G 5/00* (2006.01)

(52) U.S. Cl.
CPC ......... *B64F 5/0045* (2013.01); *G08G 5/0034* (2013.01)

(58) Field of Classification Search
CPC ........................... B64F 5/0045; G08G 5/0034
USPC .................................................. 701/3, 528
See application file for complete search history.

(56) References Cited

U.S. PATENT DOCUMENTS

| | | | |
|---|---|---|---|
| 5,070,722 A * | 12/1991 | Hawman | G01N 29/14 73/28.01 |
| 5,491,642 A | 2/1996 | Wormell et al. | |
| 6,013,921 A | 1/2000 | Moller et al. | |
| 6,549,274 B1 | 4/2003 | Arndt et al. | |
| 6,700,652 B2 | 3/2004 | Chao et al. | |
| 6,940,888 B2 | 9/2005 | Liu | |
| 7,340,967 B2 | 3/2008 | Zweifel | |
| 8,074,498 B2 * | 12/2011 | Agrawal | F01D 21/003 73/112.01 |
| 8,204,671 B2 * | 6/2012 | Agrawal | F02C 9/00 701/100 |
| 8,594,924 B2 * | 11/2013 | King | G06Q 10/0635 701/14 |
| 8,692,982 B2 | 4/2014 | Yoshioka et al. | |
| 2013/0054056 A1 * | 2/2013 | King | G06Q 10/0635 701/14 |

FOREIGN PATENT DOCUMENTS

EP 2048508 A2 4/2009

* cited by examiner

*Primary Examiner* — Tyler J Lee
(74) *Attorney, Agent, or Firm* — General Electric Company; William Scott Andes (57) ABSTRACT

A system and method including a processor coupled to the non-volatile memory and a non-transitory medium connected to the processor wherein the processor is configured to select one of a flight path between two points or a point of departure and frequency of departure in the flight path from the point for an aircraft, wherein the flight path has at least two phases and a flight along the flight path or a departure constitutes one cycle.

17 Claims, 5 Drawing Sheets

SYSTEM AND METHOD OF EVALUATING THE EFFECT OF DUST ON AIRCRAFT ENGINES

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Particles, such as dirt, dust, sand, volcanic ash, and other environmental contaminants can cause reduced operational time or "time-on-wing" for the aircraft environment, or reduced "up time" in terrestrial application. This problem is exacerbated in certain operating environments around the globe where turbine engines are exposed to significant amounts of airborne particles. Particles supplied to the turbine components can clog, obstruct, or coat the flow passages and surfaces of the components, which can reduce the lifespan of the components.

BRIEF DESCRIPTION OF THE INVENTION

In one aspect, a method of evaluating the effect of dust on aircraft engines, includes selecting one of a flight path between two points or a point of departure and frequency of departure in the flight path from the point for at least one aircraft engine, wherein the flight path has at least two phases and a flight along the flight path or a departure constitutes one cycle, determining an average dust concentration value for the two points or the point or departure at ground level, determining an average dust concentration value for each phase of the flight path, determining air density for the at least one aircraft engine at each phase of the flight path, determining dust flow through the at least one aircraft engine per cycle based on the average dust concentration values and the air density, and adjusting service of the at least one aircraft engine based on the dust flow.

In another aspect, a method of setting a maintenance schedule for an aircraft having at least one engine, includes selecting one of a flight path between two points or a point of departure and frequency of departure in the flight path from the point for the aircraft, wherein the flight path has at least two phases and a flight along the flight path or a departure constitutes one cycle, determining an average dust concentration value for the two points or the point or departure at ground level, determining an average dust concentration value for each phase of the flight path, determining air density for the at least one aircraft engine at each phase of the flight path, determining dust flow through the at least one aircraft engine per cycle based on the average dust concentration values and the air density, and scheduling maintenance service of the aircraft based on the dust flow.

In yet another aspect, a system for modeling the effects of dust on at least one aircraft engine includes a non-volatile memory having at least one database of dust parameters or dust types based on geographic locations, a processor coupled to the non-volatile memory, and a non-transitory medium connected to the processor. The processor is configured to select one of a flight path between two points or a point of departure and frequency of departure in the flight path from the point for an aircraft, wherein the flight path has at least two phases and a flight along the flight path or a departure constitutes one cycle, determine an average dust concentration value for the two points or the point or departure at ground level, determine an average dust concentration value for each phase of the flight path, determine air density for the at least one aircraft engine at each phase of the flight path, and determine dust flow through the at least one aircraft engine per cycle based on the average dust concentration values and the air density.

DESCRIPTION OF EMBODIMENTS OF THE INVENTION

The described disclosure is directed to a method and system for evaluating or modeling the effect of dust on aircraft engines, and a method of setting a maintenance schedule for an aircraft turbine blade. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications wherein dust can have an effect on a device or engine.

As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 1:
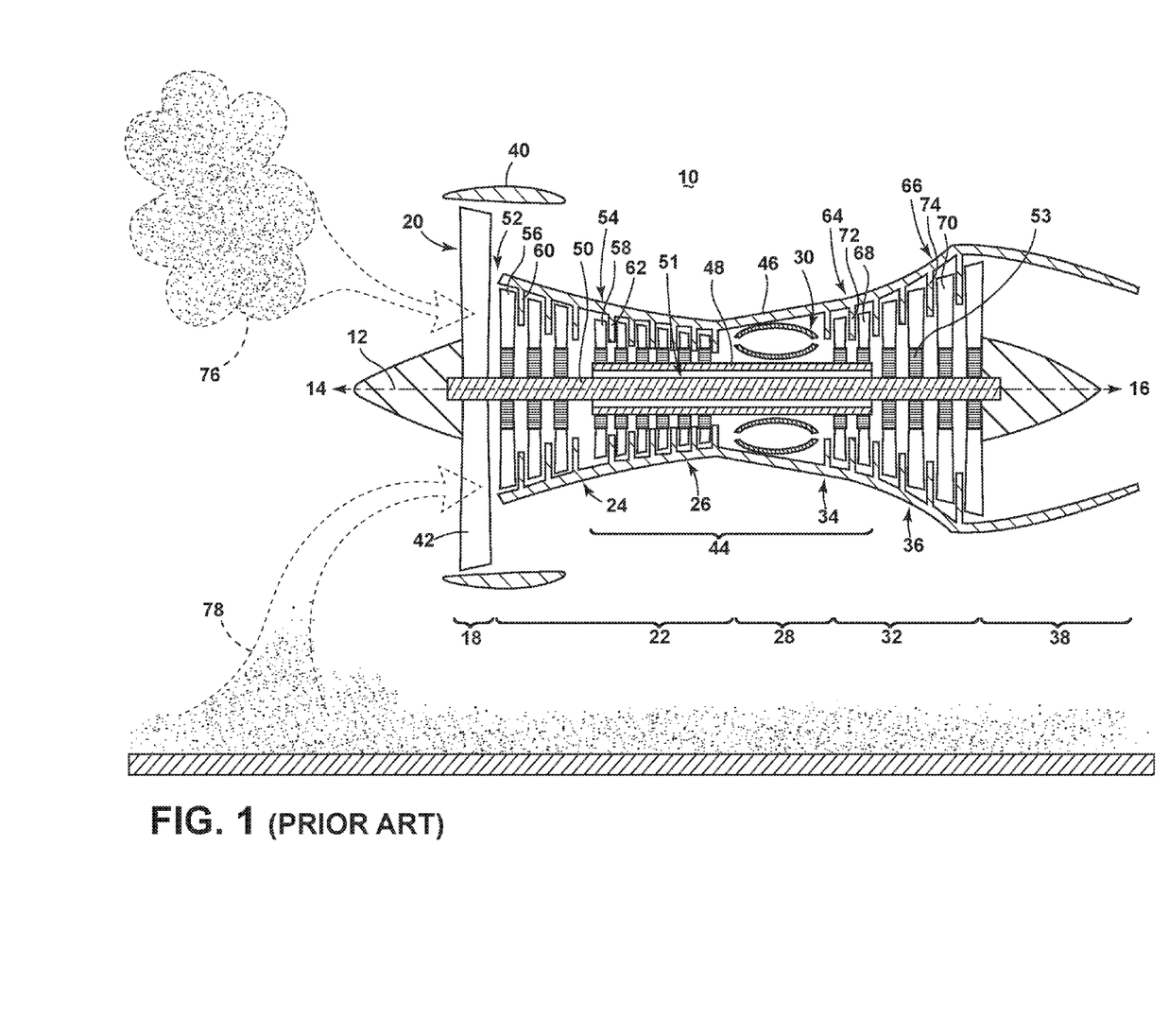
FIG. 1 is a schematic cross-sectional diagram of a prior art gas turbine engine for an aircraft.

FIG. 1 is a schematic cross-sectional diagram of a prior art gas turbine engine 10 for an aircraft, one exemplary environment in which aspects of the disclosure are relevant. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Operation of an engine 10 can be in an environment having particles, such as dirt, dust, sand, volcanic ash, and other environmental contaminants, which can be airborne or ground-based. In one example, a first set of airborne particles 76 can be drawn, sucked, ingested, or otherwise received by an operating engine 10. In another example, a second set of ground-based particles 78 can be drawn, sucked, or agitated such that they are lifted from the ground, and are further ingested or otherwise received by an operating engine 10. The particles 76, 78 received by the operating engine 10 can have the effect of causing reduced operational time or "time-on-wing" for the aircraft environment, or reduced "up time" in terrestrial application. For example, the particles 76, 78 can cause damage to engine 10 components, reduce efficiency in combustion, or can clog, obstruct, or coat the flow passages and surfaces of the components, which can further reduce the lifespan of the components.

Different geographic locations of engine 10 operation can include different types or compositions of particles 76, 78. Additionally, different geographic locations can include different amounts or quantities of particles 76, 78. In yet another example, different flight phases, such as taxi, take off, climb, descent, approach, and landing can include different types or compositions of particles 76, 78, as well as different amounts or quantities of particles 76, 78. For example, an engine 10 on an aircraft at cruise altitude is not likely to ingest or receive the set of ground-based particles 78.

Figure 2:
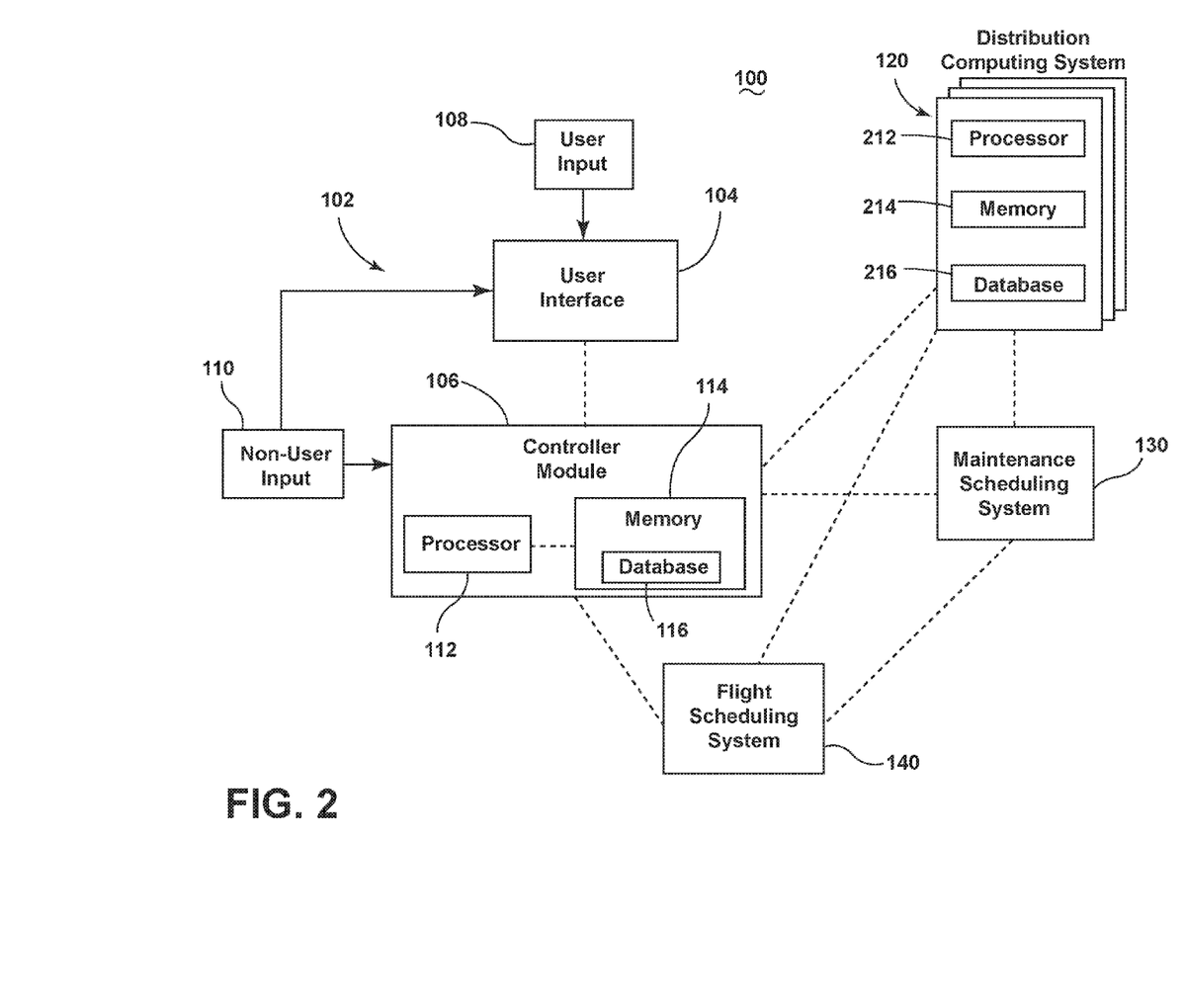
FIG. 2 illustrates an example schematic view of a system for evaluating or modeling the effect of particles on the engine in accordance with various aspects described herein.

FIG. 2 illustrates a system 100 for evaluating or modeling the effect of particles 76, 78 on at least one engine 10. As shown, the system 100 can include a terminal 102 having a user interface (UI) 104 and a controller module 106. The UI 104 can be configured to receive a user input 108, for example, by way of a computer keyboard, computer mouse, or touch screen device. Alternative to the user input 108, or in addition to the user input 108, a non-user input 110 can be received directly by the controller module 106. In this sense, the user input 108 and the user interface 104, or the non-user input 110, can be optional.

In another example embodiment, the non-user input 110 can be received by the UI 104. Additional non-limiting examples of receiving user input 108 can include voice recognition. Additional non-limiting examples of receiving non-user input 110 can include receiving sensor output or sensor values, or output from another system. Examples of sensor or another system output can include weather measurements or reading (e.g. humidity, temperature, wind speed, etc.), geographic location sensor outputs, global positioning system outputs, or flight plan values. The user input 108 and non-user input 110 can include or can be related to the particles 76, 78, the engine 10, the geographic location of the engine 10 operation, or any other inputs 108, 110 related to the above or foregoing disclosure.

The system 100 can also optionally include, for example, a distributed computing system 120, a maintenance scheduling system 130, a flight scheduler system 140, or a combination thereof. The terminal 102, distributed computing system 120, maintenance scheduling system 130, or flight scheduler system 140 can be communicatively interconnected (as illustrated by dotted line), or can be communicatively connected by way of a network, such as a local area network, wide area network, fiber optic network, or the Internet. Additional communicative interconnection examples can be included.

The controller module 106 can include a processor 112 and memory 114. The controller module 106 or processor 112 can also be operably or communicatively coupled to the UI 104 such that information or input received by the UI 104 can be operably read, interpreted, or delivered to the controller module 106 or processor 112.

The memory 114 can include non-volatile memory, non-transitory memory, random access memory (RAM), read-only memory (ROM), flash memory, or one or more different types of portable electronic memory, such as discs, DVDs, CD-ROMs, etc., or any suitable combination of these types of memory. The controller module 106 or processor 112 can further be configured to run any suitable programs. Non-limiting embodiments of the disclosure can be included wherein, for example, the controller module 106 or processor 112 can also be connected with other controllers, processors, or systems of the aircraft, or can be included as part of or a subcomponent of another controller, processor, or system of the aircraft.

A computer searchable database 116 of information can be stored in the memory 114 and accessible by the controller module 106 or processor 112. Embodiments of the disclosure can be included wherein the computer searchable database 116 can include a set of parameters related to particles 76, 78 the engine 10 can be exposed to. Non-limiting examples of the database 116 set of parameters can include particle or dust types, particle compositions, particle ratios relative to various types or compositions, particle concentration values, averages related to the aforementioned parameters, high or low expected values or ranges for the aforementioned parameters, or a combination thereof. In one example, a high value or range of the aforementioned parameters can include expected particle 76, 78 exposure experienced by detrimental, hazardous, or stormy weather conditions, such as a sand storm. Additional non-limiting examples of the database 116 can also or alternatively include the aforementioned parameter values as related to artificial particle or synthetic particle (i.e. synthetic dust). In yet another non-limiting examples of the database 116, embodiments of the disclosure can include particle 76, 78 parameters based on, related to, or organized by geographic locations.

The controller module 106 or processor 112 can run a set of executable instructions to display the database 116, for example on the UI 104, or otherwise access the database 116. It will be understood that the database 116 can be any suitable database 116, including a single database 116 having multiple sets of data, multiple discrete databases 116 linked together, or even a simple table of data. It is contemplated that the database 116 can incorporate a number of databases 116 or that the database 116 can actually be a number of separate databases 116. The database 116 can store data that can include, among other things, historical data related to the aforementioned particle 76, 78 parameter data for the engine 10, aircraft, or related to a fleet of aircraft. The database 116 can also include reference values including historic values or aggregated values.

Non-limiting embodiments of the disclosure can include configurations wherein, for example the distributing computer system 130 includes a set of processors 212, at least a memory 214, or a database 216, which can be similar to the aforementioned corresponding components of the controller module 106. In this example, the distributed computing system 120 can be configured to perform a set of processing or computing functions related to, or in place of the computing functions of the controller module 106. In this sense, the controller module 106 can be configured to execute a portion of the computer program, and to communicate with the distributed computing system 120, wherein a more complex, powerful, or resource intensive portion of the computer program can be executed to generate the output described below. The distributed computing system 120 components 212, 214, 216 can also optionally or functionally replace, stand in for, or duplicate functionality for their corresponding controller module 106 components 112, 114, 116.

One of the controller module 106 or processor 112, 212 can include all or a portion of a computer program having an executable instruction set for evaluating or modeling the effects of particles 76, 78 on the engine 10. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, and the like, that have the technical effect of performing particular tasks or implementing particular abstract data types. Machine-executable instructions, associated data structures, and programs represent examples of program code for executing the exchange of information as disclosed herein. Machine-executable instructions can include, for example, instructions and data, which cause a general-purpose computer, special purpose computer, or special purpose processing machine to perform a certain function or group of functions.

The maintenance scheduling system 130 can include any system configured to receive an input, and in response to the input, generate or schedule maintenance actions or services for an engine 10, aircraft, or fleet of engines 10 or aircraft. Likewise, in embodiments of the disclosure wherein the engine 10 is an aircraft engine 10, the flight scheduling system 140 can include any system configured to receive an input, and in response to the input, generate or schedule flight actions, services, flight plans, route information, and the like for an aircraft or a fleet of aircraft. In this sense, the maintenance scheduling system 130 and flight scheduling system 140 can be response to data or information processed, generated, or provided by the terminal 102, the distributed computing system 120, controller module 106, or processor 112, 212.

During operation of the engine 10 in an environment having particles 76, 78, and wherein the particles 76, 78 can be drawn, sucked, ingested, or otherwise received by an operating engine 10, a portion of the dust or particles 76, 78 received by the operating engine 10 can be removed or ejected from the engine 10 by way of a set of ports, including but not limited to the compressor bleed ports, or ejected from the engine 10 in exhaust. The system 100 illustrated can be used to evaluate or model the effect of dust or particles 76, 78 on at least one engine 10, and in response to the evaluation or modeling, scheduling or adjust at least one of maintenance services, flight scheduling, or the like, for the engine 10. While maintenance services or flight scheduling is described, embodiments of the disclosure can be included to estimate or predict the current or future effects on the engine 10 or aircraft fleet, based upon, for example, a history of a particular engine 10, or history of a subset of the fleet with similar flight paths or regions or cities. Embodiments of the disclosure can also be included to estimate or predict the current or future effects on the engine 10 or aircraft fleet, based upon engine operational parameters such as thrust, fuel consumption, flow rates, pressures, and temperatures. The estimations or prediction of the effects on the engine 10 can be applicable beyond maintenance services, flight scheduling, or the like, including but not limited to estimating or predicting time-on-wing, or "life" of the engine 10.

Figure 3:
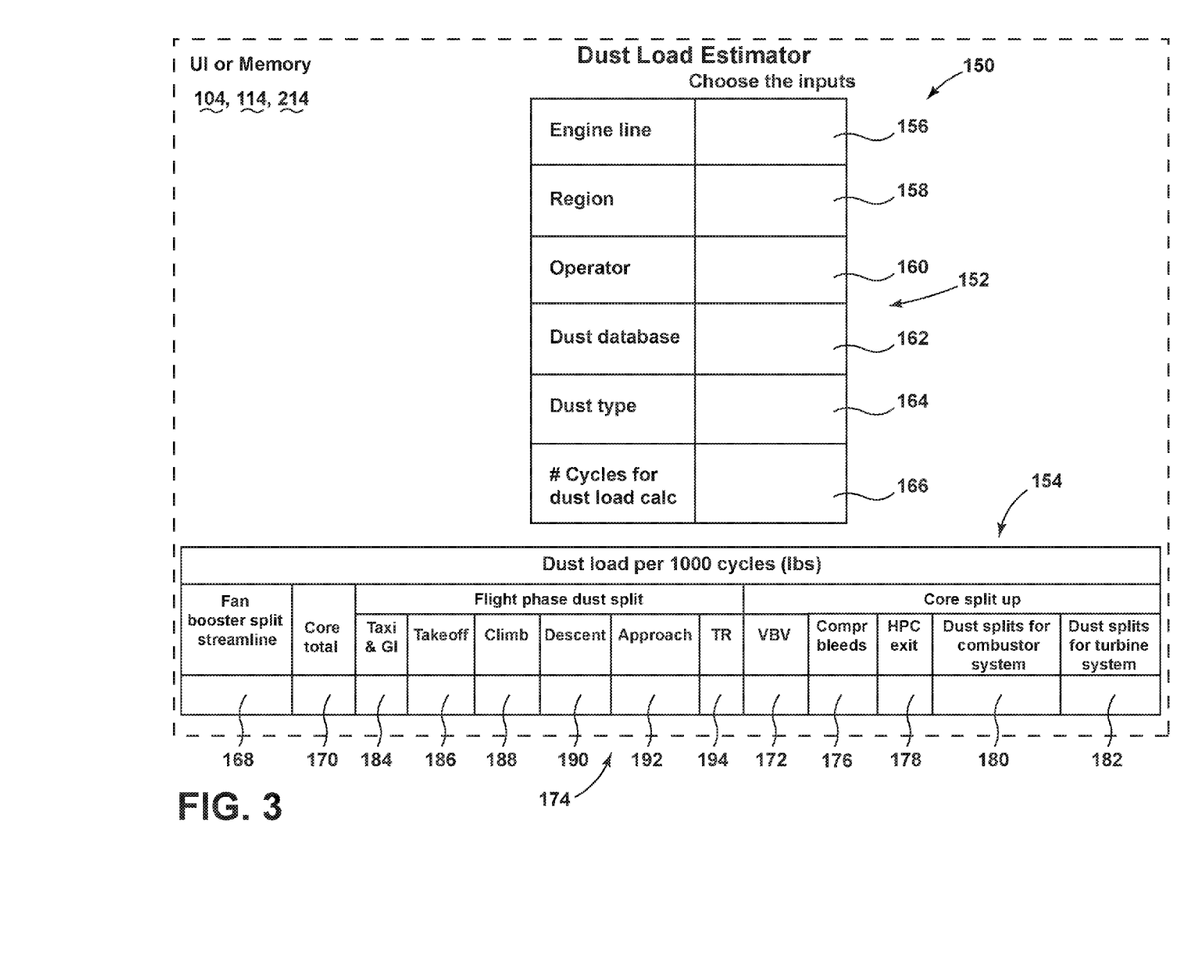
FIG. 3 is a schematic view of a dust load estimator for the system in accordance with various aspects described.

FIG. 3 illustrates a schematic view of a dust load estimator 150 for dust load estimation of an engine 10, wherein the estimator 150 includes a first portion 152 configured to receive a set of input values and a second portion 154 configured to provide a set of output values. The dust load estimator 150 can be included in the UI 104, or can be a representation of a portion of data stored in memory 114, 214. Stated another way, while the dust load estimator 150 is illustrated as a user-interactive view, embodiments of the disclosure can be included wherein the dust load estimator 150 does not have a directly interactive user interface.

The first portion 152 can be configured to provide or receive inputs from the user input 108 or non-user input 110. Non-limiting examples of inputs can include an engine line 156 or engine 10 type, a geographic region 158 where the engine 10 is, will be, or is estimated to be operated in, an operator 160 of the engine, such as the airline operator, maintenance operator, or client operator, a particle or dust database 162, a particle or dust type 164, a number of engine 10 cycles for dust load calculation 166 or estimating, or a combination thereof. At least a subset of the aforementioned inputs 156, 158, 160, 162, 164, 166 can be optional or mandatory inputs for dust load estimation, and can be configured to receive any type of inputs, including but not limited to, free text input, drop down lists, predetermined selectable values, range values, lookup tables for values, or validation of the input values. For example, validated entries can be limited to input values corresponding to known or predetermined entries in the database 116, 216. Invalid inputs can be indicated to a user or the system 100, and can prompt the user or system 100 for correction prior to dust load estimation.

The second portion 154 can be configured to generate, compute, or operably receive a set of outputs based on the dust load estimation. The second portion 154 can display the outputs for user review, or can save the output values, to be provided to the maintenance scheduling system 130 or the flight scheduling system 140. As previously mentioned, the generating, computing, or operably receiving the set of outputs can be performed by the controller module 106 or the distributed computing system 120.

Non-limiting examples of dust load output values can include a fan booster split streamline value 168, an engine core total value 170, a variable bleed valve value 172, a set of values 174 related to a set of flight phases, a compressor bleeds value 176, a high pressure compressor exit value 178, a dust splits for combustor system value 180, and a dust splits for turbine system value. Examples of the set of values 174 related to the set of flight phases dust split can include, but is not limited to, a taxi and ground idle (GI) value 184, a climb value 188, a descent value 190, an approach value 192, and a thrust reverse (TR) value 194. At least a subset of the second portion 154 of output values can be provided or outputted in a weight measurement of a dust load experienced per 1000 cycles (e.g. per 1000 flights), wherein the weight measurement is, for example, measured in kilograms or pounds. Alternative embodiments of the disclosure can include configurations wherein the output values can be provided or outputted in non-weight measurements, including volumes, ratios, percentages, and the like.

The fan booster split streamline value 168 can include a value related to or indicating an amount of dust or particles 76, 78 received by the fan 20 of the engine 10, and a value or indication of dust that bypasses the engine core 44 as opposed to ingested by the engine core 44. The core total value 170 can include a value related to or indicating an amount of dust or particles 76, 78 received by or ingested into the engine core 44 through the LP compressor 24. Similarly, the a variable bleed valve value 172, compressor bleeds value 176, or high pressure compressor exit value 178 can include a respective value related to or indicating an amount of dust or particles 76, 78 ejected or removed from the core 44 by way of the respective components or ports, or distributed or "split up" within the core 44. The set of values 174 related to the set of flight phases can include a value related to or indicating an amount of dust or particles 76, 78 received or ejected during each of the respective flight phases 184, 186, 188, 190, 192, 194 or engine operations. The dust splits for combustor system value 180 and the dust splits for turbine system value 182 can include a respective value related to or indicating an amount of dust or particles 76, 78 ingested or ejected from the respective combustion or turbine sections 28, 32 or systems.

Figure 4:
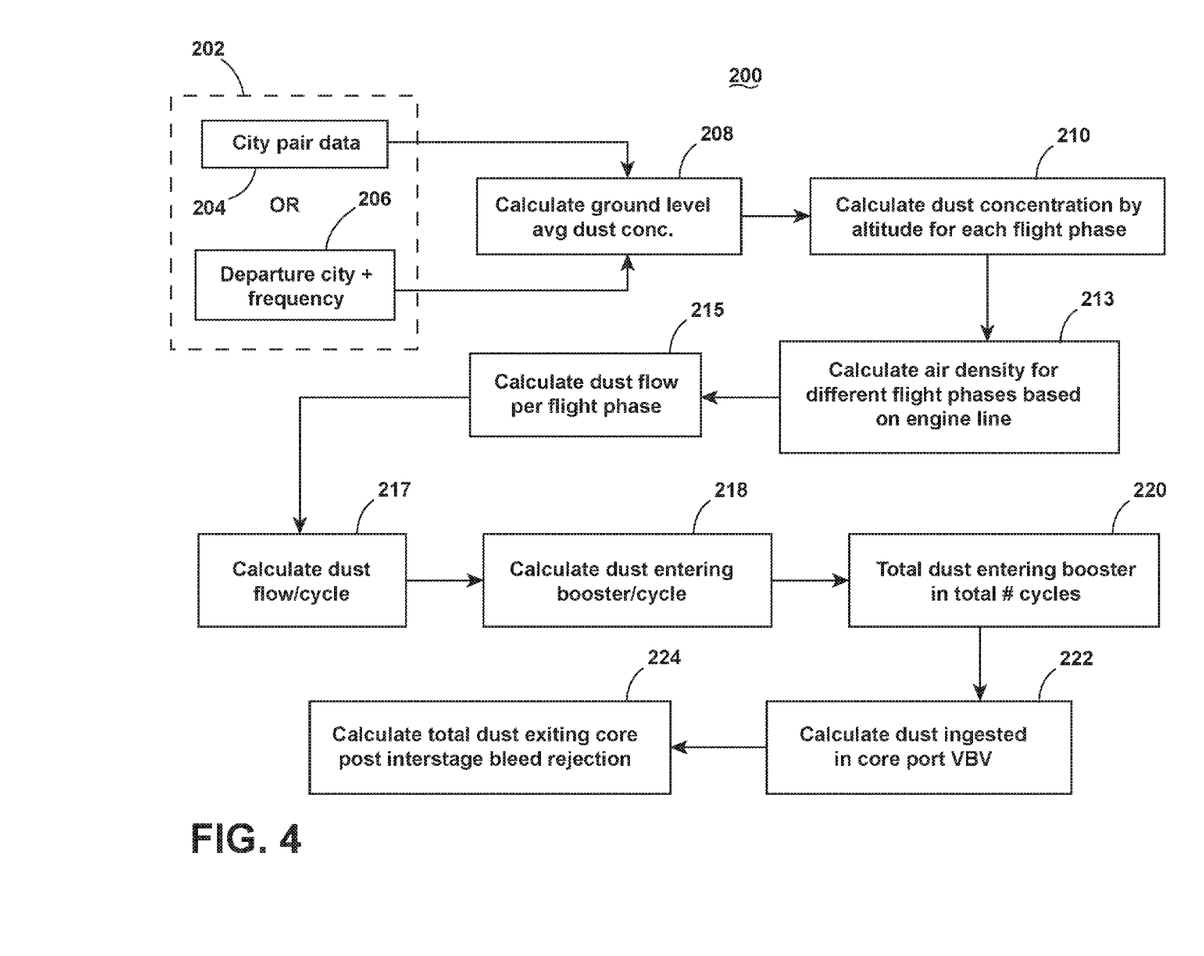
FIG. 4 is an example a flow chart diagram demonstrating a method of evaluating or modeling the effect of particles on the engine in accordance with various aspects described herein.

FIG. 4 illustrates one example flow chart demonstrating a method 200 of evaluating or modeling the effect of particles 76, 78 on an engine 10. The method 200 includes receiving at 202 user input 108 or non-user input 110 related to the aforementioned inputs 156, 158, 160, 162, 164, 166. As illustrated, the user input 108 or non-user input 110 can include city pairing data 204, that is, flight plan related data, or departure city and frequency data 206. The city pairing data 204 or departure city and frequency data 206 can include a set of parameters to be received, selected, or read from the database 116, 216. Next, the method 200 can calculate the ground level average dust concentration at 208, according to the parameters, databases 116, 216, and executable computer program. The method 200 can then calculate the dust concentration by altitude for each of the set of aforementioned flight phases at 210, according to the parameters, databases 116, 216, and executable computer program.

Following step 210, the method 200 can calculate an air density for the different flight phases at 213 based on the engine line input 156 and according to the parameters, databases 116, 216, and executable computer program. Next, the method 200 can calculate a dust flow at 215 per flight phase according to the parameters, databases 116, 216, and executable computer program. The method 200 can then calculate a total dust flow per cycle at 217 according to the parameters, databases 116, 216, and executable computer program. Based on the dust flow per cycle calculation at 217, the method 200 can then proceed to, respectively, calculate the amount, quantity, or weight of dust entering the engine 10, including, but not limited to, calculating the dust entering the booster per cycle at 218, calculating the total dust entering the booster in the total number of cycles at 220 (based for example, on the number of cycle input 166), calculate the amount, quantity, or weight of dust ingested in the core port variable bleed valve at 222, and/or finally, calculating the total dust exiting the core at 224 after or post the interstage bleed rejection of dust. The aforementioned calculated values can be provided in the second portion 154 of the UI 104 or memory 114, 214, and can be provided at the completion of the respective calculating step, or after the completion of all method 200 steps.

Figure 5:
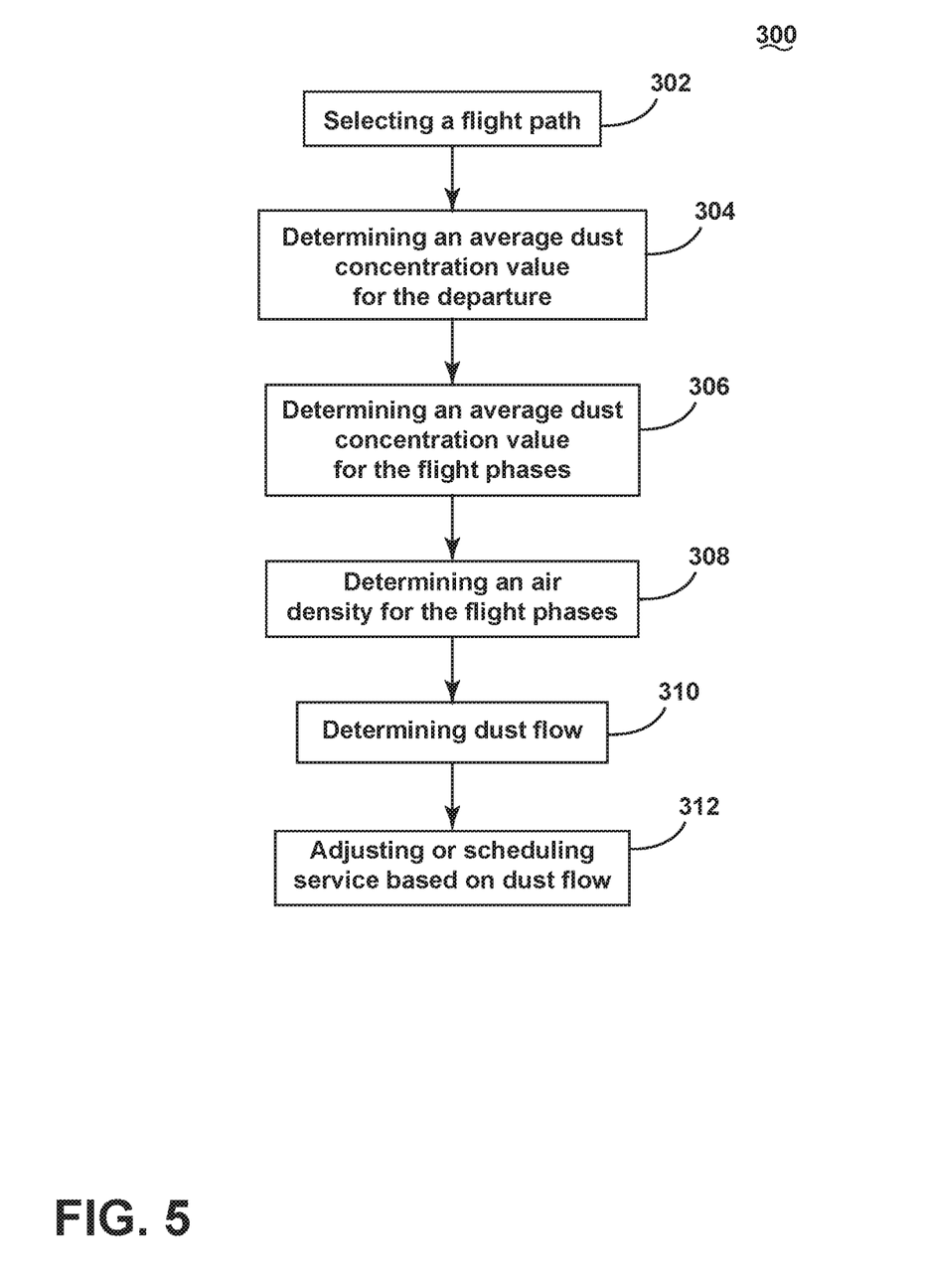
FIG. 5 is another example a flow chart diagram demonstrating a method of evaluating or modeling the effect of particles on the engine in accordance with various aspects described herein.

FIG. 5 illustrates another method 300 of evaluating or modeling the effect of particles 76, 78 on an engine 10. The method 300 includes selecting at 302 one or more flight paths between two points or a point of departure and frequency of departure in the flight path from the point for at least one aircraft engine 10, wherein the flight path has at least two phases and a flight along the flight path or a departure constitutes one cycle. The method 300 can then determine at 304 an average dust concentration value for the two points or the point or departure at ground level, followed by determining 306 an average dust concentration value for each phase of the flight path. The method 300 can continue by determining at 308 an air density for the at least one aircraft engine 10 at each phase of the flight path. Next the method 300 can determine at 310 the dust flow through the at least one aircraft engine 10 per cycle based on the average dust concentration values and the air density. After the various calculations have been performed, the method 300 can provide the calculated or determined values to at least one of the maintenance scheduling system 130 or the flight scheduling system 140 to, respectively, adjust or schedule service at 312 of the at least one aircraft engine 10 based on the dust flow. For example, the method 300 can adjust the maintenance schedule or flight schedule, by way of the respective maintenance scheduling system 130 or flight scheduling system 140, based on the method results.

The sequences depicted are for illustrative purposes only and are not meant to limit the methods 200, 300 in any way as it is understood that the portions of the methods 200, 300 can proceed in a different logical order, additional or intervening portions can be included, or described portions of the method can be divided into multiple portions, or described portions of the method can be omitted without detracting from the described methods 200, 300. Many other possible embodiments and configurations in addition to that shown in the above figures are contemplated by the present disclosure. For example, an optional method 200, 300 step can include determining a dust type for the flight path, based on the dust database input 162, the dust type input 164, the city pairing data 204, the departure city and frequency data 206, or the parameters of the database 116, 216.

Additionally, the design and placement of the various components can be rearranged such that a number of different in-line configurations could be realized.

The embodiments disclosed herein provide a method and system for evaluating or modeling the effect of dust on an engine. The technical effect is that the above described embodiments enable adjusting or scheduling of service, such as flight service or maintenance service, based on the evaluated or modeled effects. One advantage that can be realized in the above embodiments is that the above described embodiments can enable accelerated learning on regional or particle-based environmental challenges experienced by engines. Another advantage can include identifying or addressing engine problems prior to or earlier than conventional systems or methods, resulting in reduced maintenance or service operations, reduced downtime for the engine, and the like. Yet another advantage can include testing or evaluation the particle robustness of engines prior to installation or operation of the engines, or to evaluate or model the expected maintenance or service costs associated therewith.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of evaluating the effect of dust on aircraft engines, comprising:
   selecting one of a flight path between two points or a point of departure and frequency of departure in the flight path from the point for at least one aircraft engine, wherein the flight path has at least two phases and a flight along the flight path or a departure constitutes one cycle;
   providing a non-volatile memory having at least one database of dust parameters or dust types based on geographic locations;
   determining by retrieving from the database an average dust concentration value for the two points or the point or departure at ground level;
   determining by retrieving from the database an average dust concentration value for each phase of the flight path;
   determining air density for the at least one aircraft engine at each phase of the flight path;
   determining dust flow through individual components of the at least one aircraft engine per cycle based on the average dust concentration values and the air density; and
   adjusting service of the at least one aircraft engine based on the dust flow.

2. The method of claim 1 wherein each phase of the flight path includes at least one of taxi, take off, climb, descent, approach, or landing.

3. The method of claim 1 wherein the individual components include at least one of a variable bleed valve, high pressure compressor, a compressor bleed, a turbine system, or a combustor.

4. The method of claim 1 further comprising determining a dust type for the flight path.

5. The method of claim 4 wherein the determining the dust type for the flight path further comprises determining at least one of a dust particle composition, a dust particle ratio, a dust particle concentration value, an average dust particle composition, or a range of dust particle composition.

6. The method of claim 1 further comprising determining a total dust load for the at least one aircraft engine per cycle.

7. A method of setting a maintenance schedule for an aircraft having at least one engine, comprising:
   selecting one of a flight path between two points or a point of departure and frequency of departure in the flight path from the point for the aircraft, wherein the flight path has at least two phases and a flight along the flight path or a departure constitutes one cycle;
   providing a non-volatile memory having at least one database of dust parameters or dust types based on geographic locations;
   determining by retrieving from the database an average dust concentration value for the two points or the point or departure at ground level;
   determining by retrieving from the database an average dust concentration value for each phase of the flight path;
   determining air density for the at least one aircraft engine at each phase of the flight path;
   determining dust flow through individual components of the at least one aircraft engine per cycle based on the average dust concentration values and the air density; and
   scheduling maintenance service of the aircraft based on the dust flow.

8. The method of claim 7 wherein each phase of the flight path includes at least one of taxi, take off, climb, descent, approach, or landing.

9. The method of claim 7 wherein the individual components include at least one of a variable bleed valve, high pressure compressor, a compressor bleed, a turbine system, or a combustor.

10. The method of claim 7 further comprising determining a dust concentration for the flight path.

11. The method of claim 7 further comprising determining a total dust load for the at least one aircraft engine per cycle.

12. A system for modeling the effects of dust on at least one aircraft engine, comprising:
    a non-volatile memory having at least one database of dust parameters or dust types based on geographic locations;
    a processor coupled to the non-volatile memory; and
    a non-transitory medium connected to the processor wherein the processor is configured to select one of a flight path between two points or a point of departure and frequency of departure in the flight path from the point for an aircraft, wherein the flight path has at least two phases and a flight along the flight path or a departure constitutes one cycle; determine by retrieving from the database an average dust concentration value for the two points or the point or departure at ground level; determine by retrieving from the database an average dust concentration value for each phase of the flight path; determine air density for the at least one aircraft engine at each phase of the flight path; and determine dust flow through individual components of the at least one aircraft engine per cycle based on the average dust concentration values and the air density.

13. The system of claim 12 wherein each phase of the flight path includes at least one of taxi, take off, climb, descent, approach, or landing.

14. The system of claim 12 wherein the individual components include at least one of a variable bleed valve, high pressure compressor, a compressor bleed, a turbine system, or a combustor.

15. The system of claim 12 wherein the processor is further configured to determine a dust type for the flight path.

16. The system of claim 12 wherein the processor is further configured to determine a total dust load for the at least one aircraft engine per cycle.

17. The system of claim 12 wherein the database of dust parameters or dust type further comprises at least one of a dust particle composition, a dust particle ratio, a dust particle concentration value, an average dust particle composition, or a range of dust particle composition.

* * * * *